UNITED STATES PATENT OFFICE.

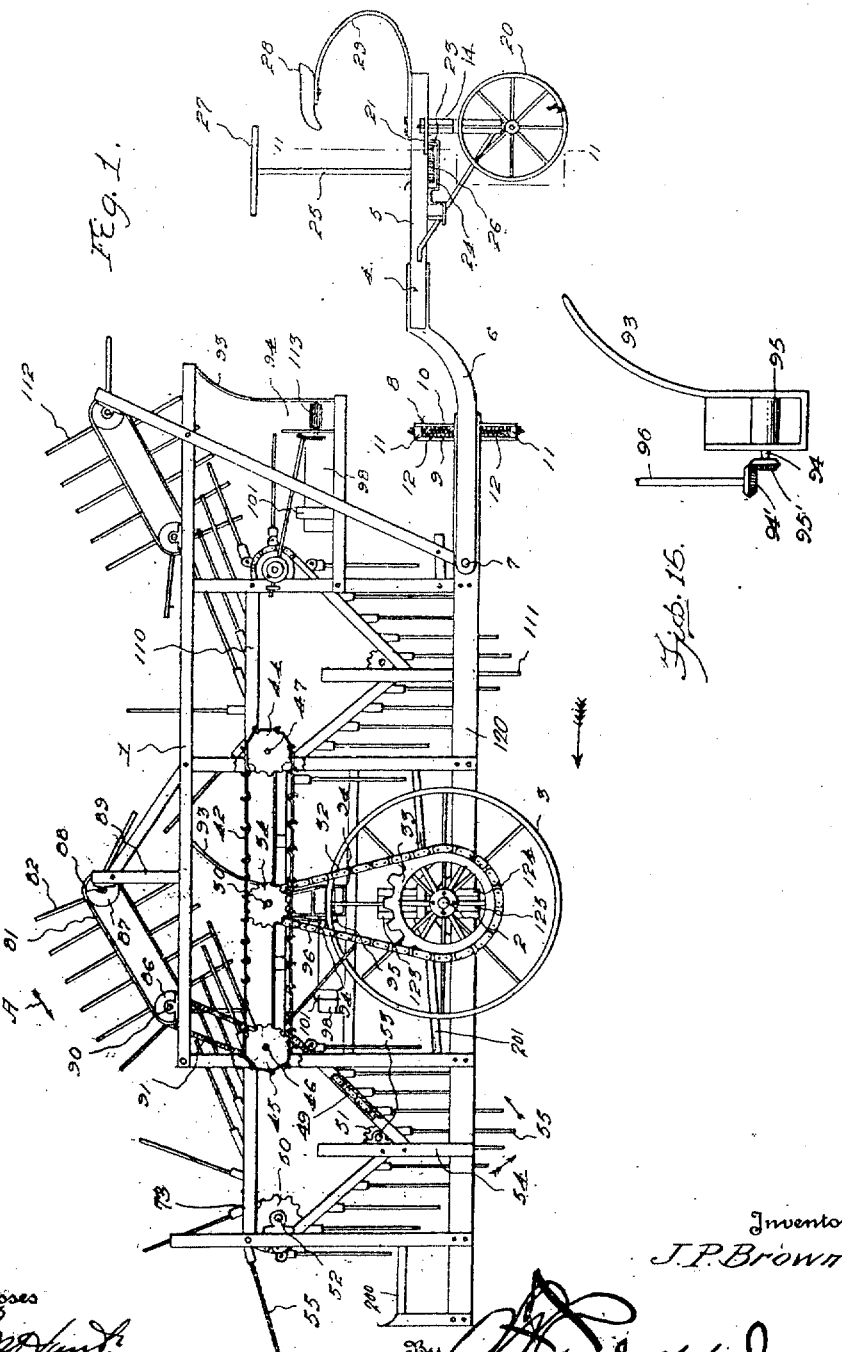

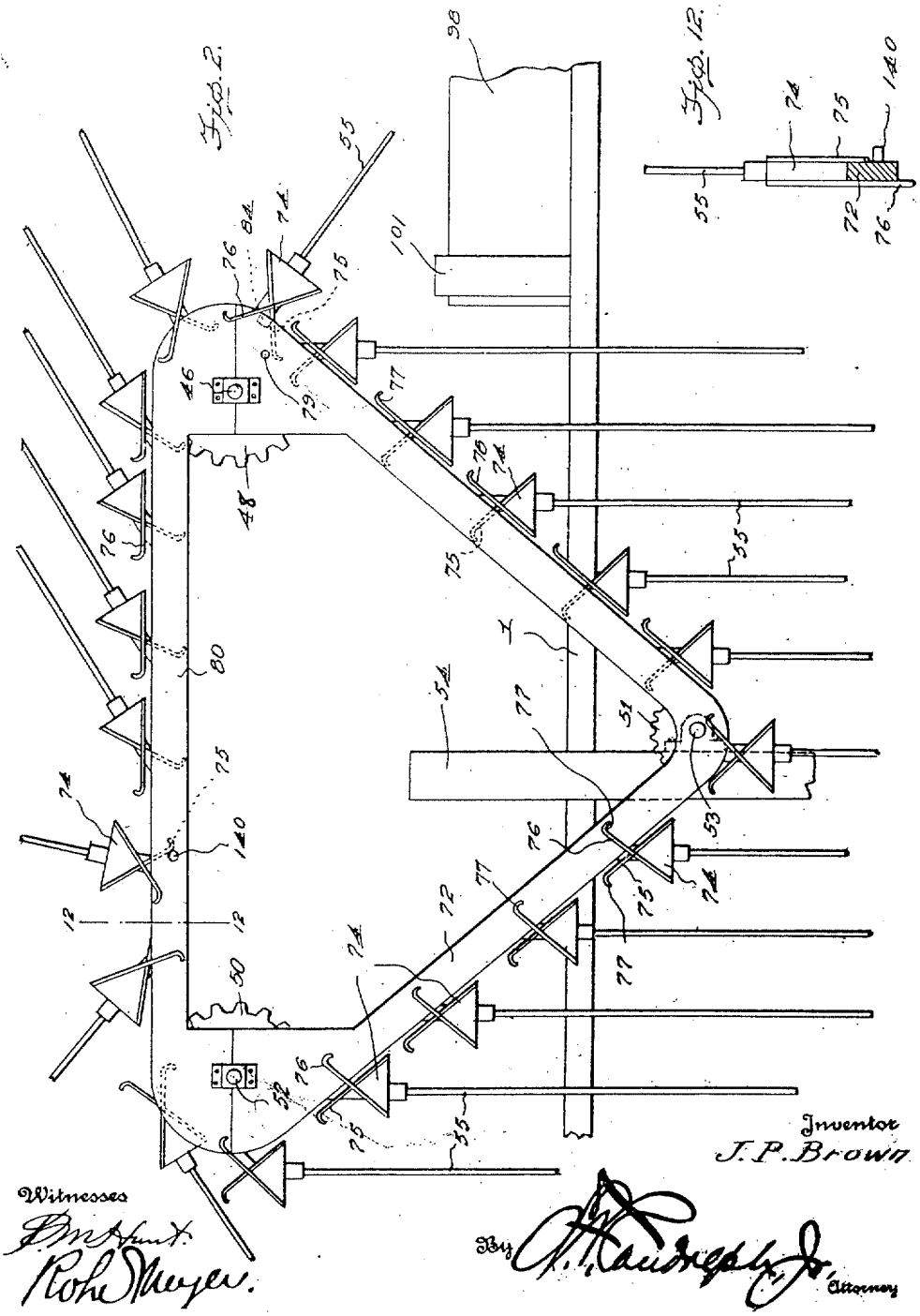

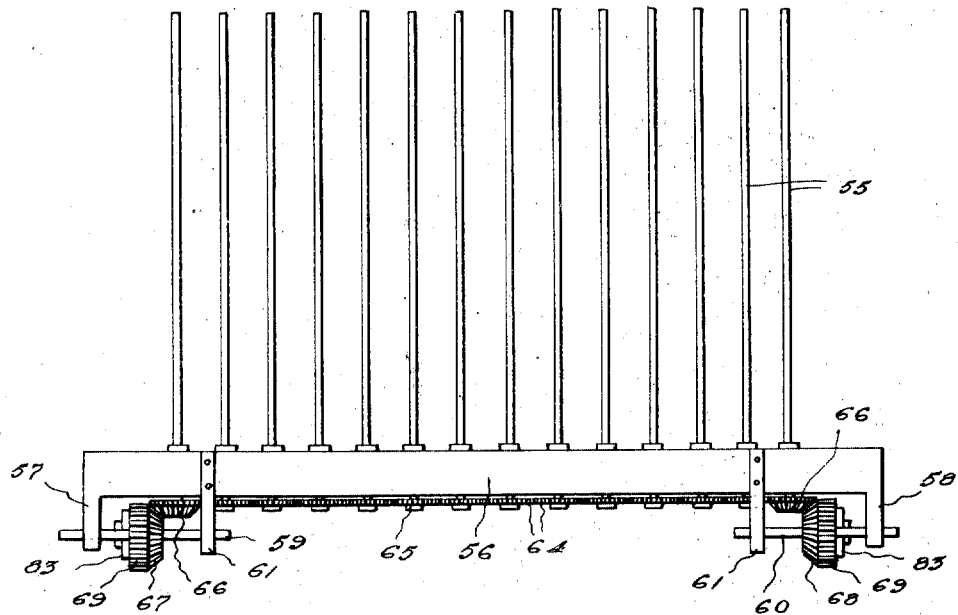
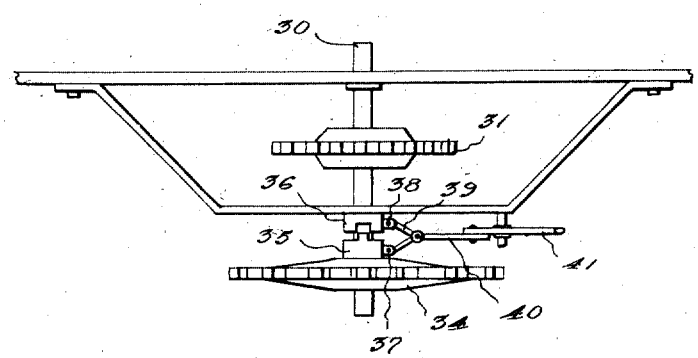

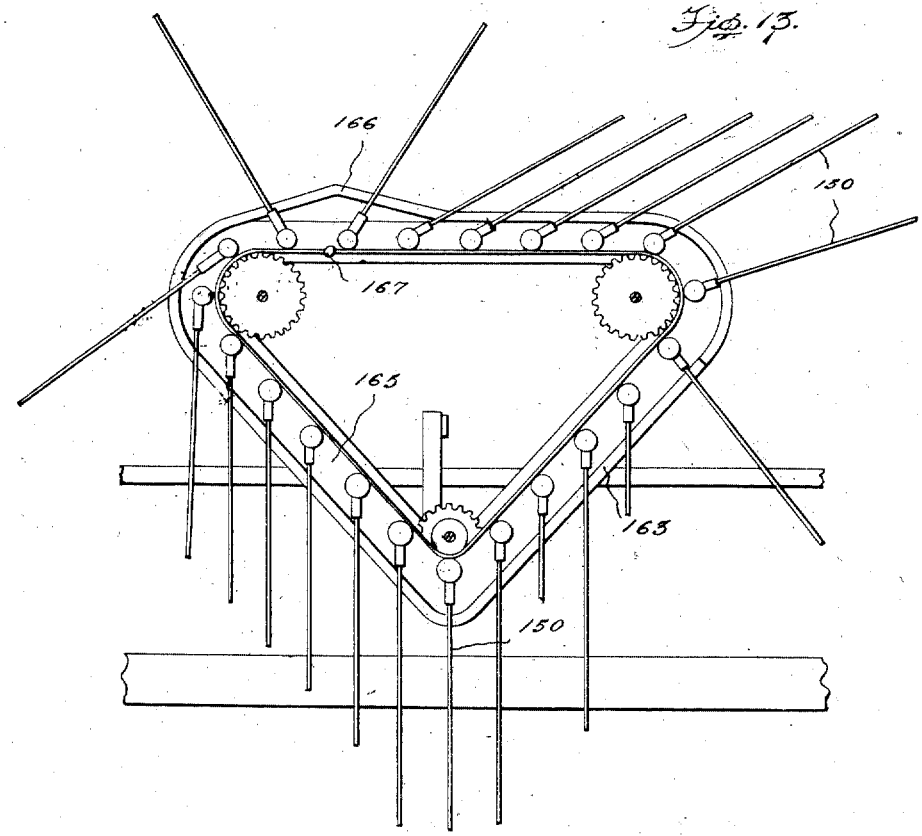
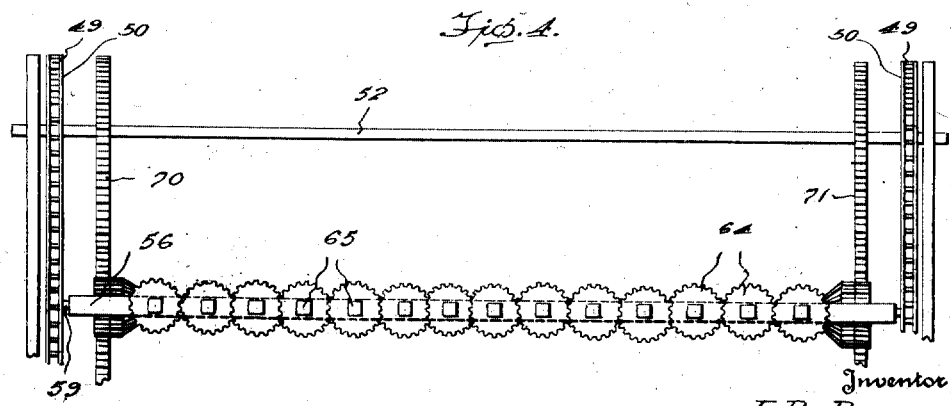

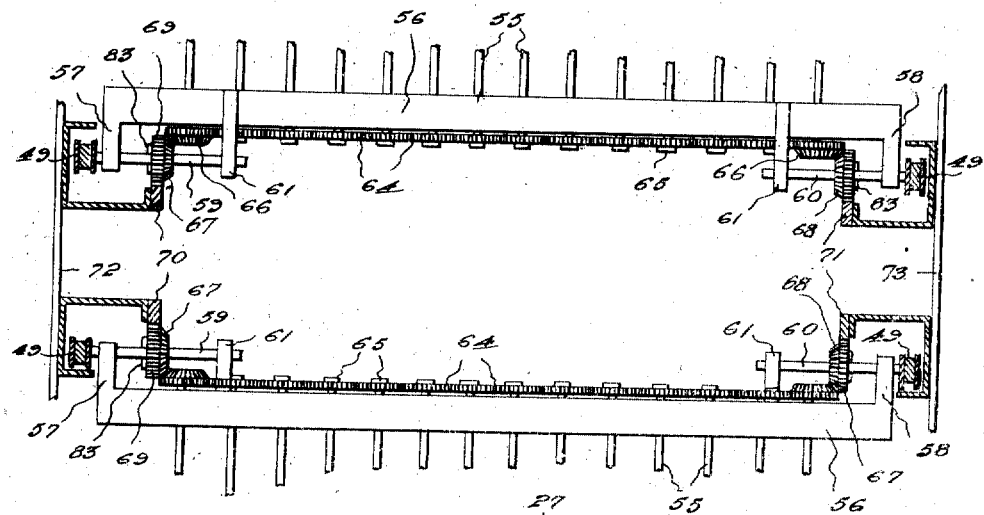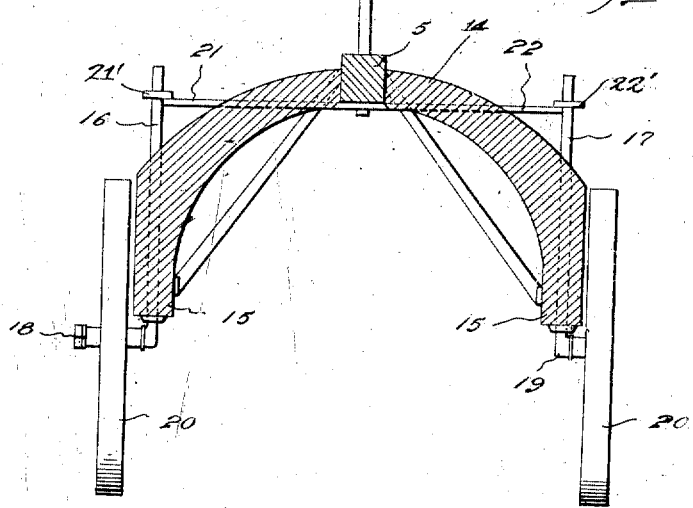

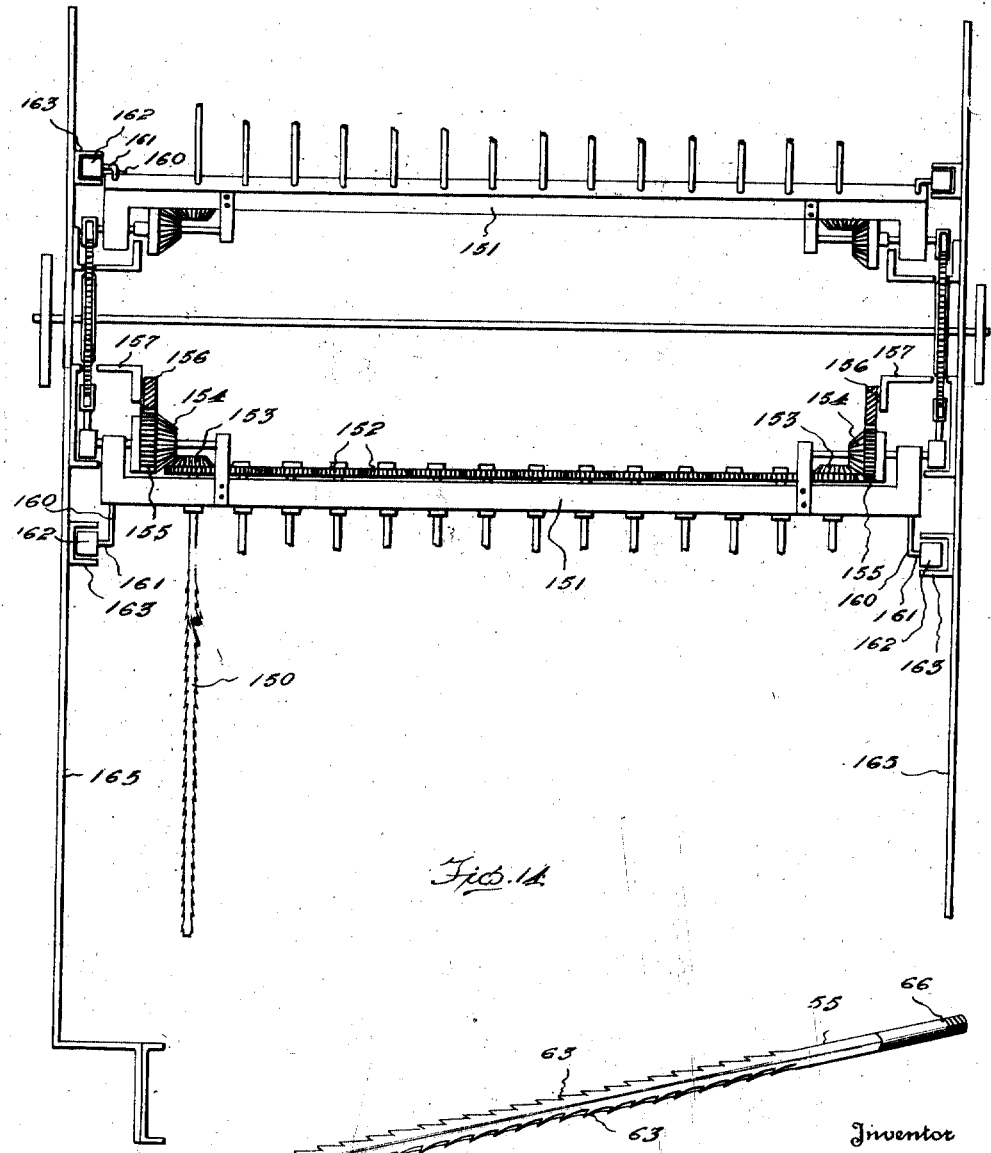

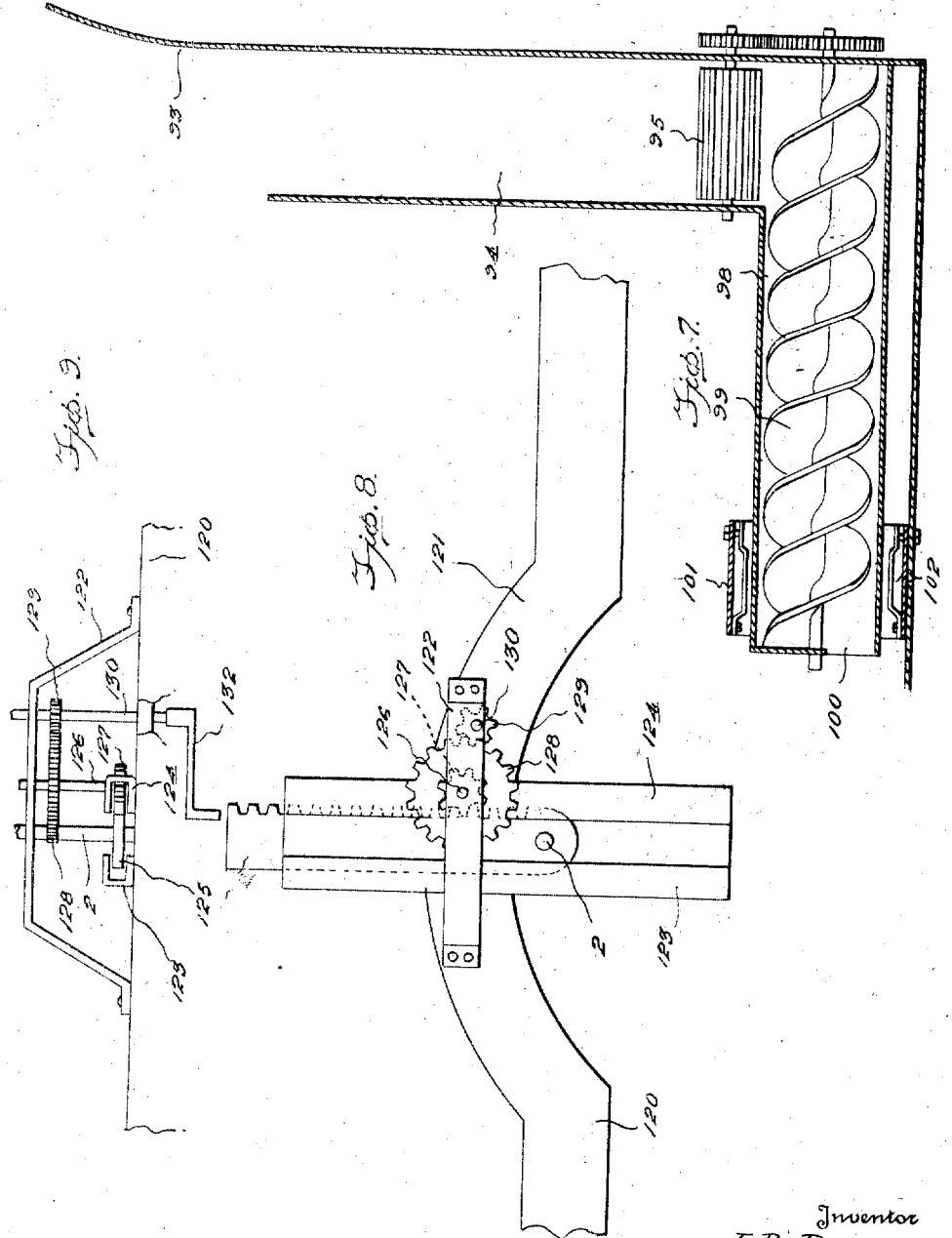

JOSEPH P. BROWN, OF FREDERICK, OKLAHOMA.

COTTON-PICKER.

1,212,899.   Specification of Letters Patent.   Patented Jan. 16, 1917.

Application filed August 31, 1915. Serial No. 48,340.

*To all whom it may concern:*

Be it known that I, JOSEPH P. BROWN, a citizen of the United States, residing at Frederick, in the county of Tillman and State of Oklahoma, have invented certain new and useful Improvements in Cotton-Pickers; and I do hereby declare the following to be a full, clear, and exact description of the invention, such as will enable others skilled in the art to which it appertains to make and use the same.

This invention relates to cotton pickers, and the primary object of the invention is to provide a device for picking or gathering cotton, which will pick the cotton in a comparatively clean state, preventing the gathering of particles of the pods, stems, sticks or the like.

Another object of this invention is to provide a cotton picking machine, which includes a plurality of barbed spindles, which are rotatably connected in gangs, and further to provide means for causing the spindles to travel about, in a triangular path, for engaging the cotton, while the spindles are in a vertical position, so as to remove the raw cotton from the pods without breaking the cotton plant or crushing the pods in any way.

Another object of this invention is to provide automatically acting stripping means, which will strip the cotton from the picking or gathering spindles, at a predetermined time, and further to provide cotton picking spindles which are substantially rectangular shaped in cross section, having barbs formed along two of its opposite edges, and pointing downwardly, for engaging the raw cotton and pulling it from the pods, and still further to provide means for automatically turning the smooth corners of the spindles toward the stripping fingers, so that the cotton may be efficiently stripped from the spindles by the action of the strippers.

A still further object of this invention is to provide means for guiding and holding the spindles in a vertical position, while traveling in a cotton engaging position, and for holding them in a predetermined definite position while the cotton is being stripped therefrom, said means further acting to automatically turn the spindles over and guide them into a vertical position for reëngagement with the cotton.

Another object of this invention is to provide conveyers for receiving the cotton from the stripping means, which conveyers feed the cotton to sacking means, whereby the cotton may be sacked for transportation to a gin or storehouse.

Other objects of the invention are to provide a multiple set of the gangs of picking spindles arranged in staggered relation to each other, one positioned forwardly of the other for engaging all of a cotton plant and efficiently picking or gathering the cotton therefrom; to provide a tractile supporting structure which is propelled from the rear of the same so as to eliminate the liability of the crushing or breaking down of the cotton plants by the means employed for propelling the cotton picker; to provide novel structure for steering the cotton picker; to provide means for operating the picking spindles by the traction of the supporting structure, and also means for raising and lowering the picking structure into or out of an operative position and for throwing it into and out of operation by the travel of the machine.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the complete cotton picking machine, Fig. 2 is a fragmentary longitudinal section through the cotton picking machine, Fig. 3 is a plan of one of the gangs of picking spindles, showing the means for rotating the same, Fig. 4 is an end view of one of the gangs of picking fingers, Fig. 5 is a fragmentary cross section through part of the cotton picking structure, Fig. 6 is a perspective view of one of the cotton picking spindles, Fig. 7 is a sectional view through the means for carrying the cotton from the strippers and sacking the same, Fig. 8 is a side elevation of the means for moving the cotton picking structure into and out of an operative position, Fig. 9 is a plan view of Fig. 8, Fig. 10 is a plan view of a clutch mechanism employed for throwing the picking gangs into and out of operation, Fig. 11 is a cross section on the line 11—41 of Fig. 1, Fig. 12 is a section on the line 12—12 of Fig. 2, Fig. 13 is a fragmentary sectional view through the machine, showing a modified form of means for operating the picking fingers, Fig. 14 is a plan view of the structure illustrated in Fig. 13, Fig. 15 is a detail view of a conveyer structure employed in the cotton picker construction.

Referring more particularly to the drawings, 1 designates the supporting frame of the cotton picker, which frame is counterbalanced upon the main or drive axle 2, which axle is positioned substantially equidistant of the ends of the frame 1, and has supporting wheels 3 mounted thereon.

An auxiliary frame 4 is connected to the rear end of the main supporting frame 1. The auxiliary frame 4 comprises a platform 5, which has arms 6 connected thereto. The arms 6 extend forwardly from the platform 4, and are pivotally connected at 7 to the sides of the main frame 1. The arms 6 are yieldably connected to the main frame 1 for limited vertical movement independent of the frame by means of a construction illustrated at 8. The construction 8 includes a bolt about which is coiled spiral springs 12. The bolt has collars 11 mounted thereon which are engaged by the outer ends of the springs while the inner ends of the springs engage the upper and lower surfaces of the arms 6 for permitting a limited yieldable movement of the arms upon the bolts and with respect to the main frame 1. The bolt is carried by and secured to brackets 9 and 10.

The platform 5 has an arch frame 14 secured to the under surface of the rear end of the same. The platform may be countersunk into the upper surface of the arch frame 14, if desired, as is clearly shown in Fig. 11 of the drawings. The lower ends of the frame 14 are positioned vertically, and substantially parallel to the sides of the platform 5, as is shown at 15. Axles 16 and 17 are rotatably carried by the straight portion 15 of the frame 14, and they extend upwardly through the arch frame upon opposite sides of the platform 5. The lower ends of the axles, which extend below the ends 15 of the frame 14, are bent or disposed at right angles to the vertical portions of the axles 16 and 17, forming spindles, indicated at 18 and 19, upon which supporting wheels 20 are mounted.

The upper ends of the axles 16 and 17 have cross rods 21 and 22 connected thereto by bars 21' and 22', which cross rods extend inwardly toward the platform 5, and are positioned beneath the under surface of the same. The bars 21' and 22' are connected to the cross rods 21 and 22 by slot and pin connections. The inner end of the cross rods 21 and 22 are connected to a rack bar 23, which is slidably supported by a bracket 24, secured to the under surface of the platform 5. A steering post 25 is rotatably carried by the platform and has a gear 26 mounted upon its lower end and positioned beneath the platform 5 and in meshing engagement with the teeth formed upon the rack bar 23. A steering wheel or handle 27 is mounted upon the upper end of the post 25, and positioned in close proximity to a seat 28. The seat 28 is of the ordinary construction and supported by a resilient or spring standard 29, which is secured to the platform 5. By rotating the steering wheel 27, the rack bar 23 may be moved longitudinally, for steering the supporting wheels 20, for guiding the direction of travel of the cotton picker.

The supporting frame 1 has a shaft 30 rotatably carried thereby, substantially equidistant of its ends and positioned directly above the axle 2. A sprocket 31 is mounted upon the shaft 30, and a sprocket chain 32 travels about the same. The sprocket chain 32 also travels about a sprocket 33, which is carried by the axle 2, so that the shaft 30 will be rotated by the rotation of the axle. The shaft 30 has a sprocket 34 feathered thereon, which sprocket has a clutch segment 35 formed upon one face of the same, which is adapted for co-action with a clutch segment 36, which is keyed to the shaft 30. The segments 35 and 36 have outwardly extending ears 37 and 38 formed thereupon, to which ears are connected links 39. The links 39 have their outer ends converging, and pivotally connected to a bar 40, which bar is in turn connected to a pivoted lever 41, so that, when the lever 41 is rocked, the links 39 will be moved toward each other for moving the segments 35 and 36 into meshing engagement with each other.

The lateral body 1 extends to any desired position within convenient reach of the operator of the device.

A sprocket chain 42 travels about the sprocket 34. The links of the chain 42 mesh with the teeth of the sprocket 34, upon opposite sides of the shaft 30, as is clearly shown in Fig. 1 of the drawings. The sprocket chain 42 travels about sprockets 44 and 45, which are carried by shafts 47 and 46. The shaft 46 is positioned forwardly of the shaft 30, with respect to the frame 1, while the shaft 47 is positioned rearwardly of the same.

The shaft 46 has sprockets 48 mounted thereon, upon opposite sides of the frame 1. Sprocket chains 49 travel about the sprockets 48, and about sprockets 50 and 51, causing the chain to travel in a substantially triangular path. The sprockets 50 are carried by a shaft 52, positioned at the forward end of the frame 1, and the sprockets 51 are carried by a shaft 53, which is positioned downwardly from the shafts 46 and 52, and substantially equi-distant of the same. The shaft 53 is rotatably supported by auxiliary standards 54, which are secured to the frame 1.

The sprocket chains 49 have a plurality of gangs of cotton picking spindles 55 secured thereto at spaced intervals about their lengths. Each gang of the cotton picking spindles 55, is supported by a frame 56, which has arms 57 and 58 formed upon its ends and extending outwardly therefrom. Shafts 59 and 60 are rotatably supported by the arms 57 and 58 respectively, and by standards 61, which are secured to the frame 56 inwardly of their ends. The outer end of the shafts 59 and 60 projects beyond the arms 57 and 58, and are rotatably mounted in the sprocket chains 40, so as to permit the frame 56 and the gangs of spindles 55 which are carried by each of the frames 56, to always maintain substantially a vertical position, except at times, as will be hereinafter more fully described. The spindles 55 are substantially rectangular shaped in cross section, as is clearly shown in Fig. 6 of the drawings.

The spindles 55 have barbs 63, formed upon two of their diagonally opposite edges, which barbs have their points extending downwardly. The edges other than those upon which the barbs 56 are formed, are perfectly smooth, for facilitating the stripping of the cotton from the picking spindles.

The spindles 55 extend through and are rotatably mounted in the frame 56, and they have gears 64 mounted upon their inner short ends, which project through the frame 56. The gears 64 are held in place by nuts 65, which are mounted upon the screw threaded end 66 of the spindles 55. The gear 64, which is mounted upon one of the spindles 55, meshes with the gears, which are mounted upon the ends of the spindles next thereto, thereby causing the spindles to rotate in a direction oppositely to the spindle next thereto. The outermost spindles 55, of each gang, have beveled gears 66 mounted upon their ends, which project through the frame 56, in addition to the ordinary gear 64. The gears 66 mesh with beveled gears 67 and 68, which are mounted upon the shafts 59 and 60 respectively. The beveled gears 67 and 68 have the ordinary peripheral gear teeth indicated at 69 formed upon their peripheries, which teeth 69 are provided for meshing engagement with the rack teeth carried by racks 70 and 71, which are carried by the substantially triangularly shaped frames 72 and 73. The meshing engagement between the teeth 69 and the racks 70 and 71, will rotate the spindles 55, through the meshing of the gears which are carried thereby, during the travel of the gangs of spindles with the sprocket chains 49, about the triangular path of the chain which is formed by the mounting of the sprockets 47 and 48, 50 and 51.

The frames 56 have triangularly shaped members 74 mounted upon their ends which travel in close proximity to the frame 72. The outer surface of the frame 72 forms a surface or track by which the triangularly shaped members 74 are guided in their travel. The triangularly shaped members 74 have arms 75 and 76 secured to two of their sides, which arms cross at the apex of the triangular portions. The arms 75 are positioned upon one side of the frame 72, and the arms 76 upon the other side as clearly shown in Fig. 2 of the drawings. The arms 75 and 76 have their ends slightly curved, as is shown at 77.

During the movement of the spindles 55 into a cotton picking position, the arms 75 are positioned substantially parallel to the outer edge of the forward section of the triangularly shaped frame 72, and one side of the triangular member 74 rides along the frame 72, maintaining the gangs of spindles in a vertical position, causing the spindles to engage the cotton in a vertical manner, during which they are being rotated, by the action of the gears 64. The rotation of the spindles causes the barbs 63 to engage the cotton fiber and pull the same free from the pods. The gangs of the spindles travel downwardly, along the forward edge of the triangular frame 72, until they reach the lower point of the frame, whence they travel upwardly, along the rear edge of the rear side of the frame. When one of the gangs of spindles reaches the upper end of the rear side of the frame 72, the arm 75, which is carried by the gangs of spindles, engages a stop or projection 79, which turns the frame 56, and the spindles 55, so that they will assume an inclined position, having the face of the triangular portion 74 along which the arms 76 extend, positioned parallel with and resting upon the upper surface of the horizontal portion 80 of the frame 72, which positions the spindles parallel with the conveyer 81, which carries the stripping fingers 82.

The gears 67 and 68 have projections 83 formed upon their outer faces, which projections are positioned for engagement with projections 84 situated near the projection 79 and which are formed upon and extend inwardly from the upper inner corner of the triangularly shaped frame 72, which will rotate the gears 67 and 68, and consequently the gears 64 sufficiently for positioning the smooth edges of the spindles toward each other and toward the stripping fingers 82, so that the cotton may be easily removed from the spindles. The racks 70 and 71 terminate a short distance below the projections 84.

The stripping fingers 82 are carried by the conveyer 81, which conveyer travels about rollers 86 and 87. The roller 86 is mounted upon the upper surface of the frame 1, while the roller 87 is carried by a shaft 88, which is supported by an upstanding brace 89. The stripping belt or conveyer 81 travels at an incline, or angle with respect to the frame 1, and it is positioned parallel with the angle of the spindles 55, when they are positioned above the rearmost portions of the upper side of the triangular frame. The roller 86 is mounted upon a shaft 90, which shaft is rotated by the shaft 46, through the medium of a sprocket chain 91, and necessary sprockets, which are mounted upon the shafts 46 and 90. The conveyer 81 is operatively connected to the shaft 46, so that the stripping fingers 82 will travel in the path indicated by the arrow A in Fig. 1 of the drawings, and enter between the various spindles in each gang, toward the frames 56, moving outwardly along the spindles, during their upward travel, and thereby efficiently stripping the cotton from the barbs 63, which are formed along the edges of the spindles.

The cotton, after it is stripped from the spindles, is thrown by the stripping fingers against an upstanding dash-board 93, which forms one side of a trough 94 in which a conveyer 95 is mounted. The conveyer 95 is operated in any suitable manner, such as by beveled gears 94' and 95' from the shaft 30. The beveled gear 94' is carried by a substantially vertically positioned shaft 96, which latter shaft may be operatively connected to the shaft 30 for rotation by the latter, in any of a number of ordinary constructions.

The outlet end of the trough 94 communicates with a housing 98, in which is mounted a feeding screw 99. The housing 98 has an opening 100 formed in its outer end, which opening is provided for permitting of the outlet of the cotton from the housing 98. The housing 98 has clamps 101 and 102 secured to the upper and lower surfaces of its outer end, which clamps are provided for engaging a sack, for holding the same securely connected to the housing, so that the cotton upon passing out of the housing, will enter the sack. The provision of the spiral feeding screw 99, will tend to pack the cotton within a sack, after which the cotton may be easily and conveniently transported to a gin or storage building.

The supporting frame 1 has a second picking structure, generically indicated by the numeral 110, carried thereby rearwardly of the picking structure which has been heretofore described. The structure 110 is identical in all respects with the structure heretofore described, except that the spindles 111 of the structure 110, are disposed in staggered relation to the spindles 55, of the forward picking structure, so that the picker will efficiently gather all of the cotton from the cotton plant.

The stripping fingers 112, which strip the cotton from the spindles 111, deliver the cotton to a conveyer 113, which in turn delivers the cotton to a spiral feed screw similar in construction to the screw 99.

The cotton picking machine is constructed so that the mechanism can be raised or lowered for the purpose of taking the machine from one field to another, or while operating in the field. This construction is clearly illustrated in Figs. 8 and 9 of the drawings. The lower sill 120 of the frame 1, is provided with an arch 121, to which is secured a metallic guiding strap 122. Substantially U-shaped guide members 123 and 124 are secured to the sides of the sill 120, and they have slidably mounted therein a rack bar 125, the lower end of which supports the axle 2 of the machine. A shaft 126 is rotatably carried by the sill 120 and by the bracket 122. A pinion 127 is mounted upon the shaft 126, and it meshes with the teeth of the rack 125. A gear 128 is also mounted upon the shaft 126, and it meshes with a pinion 129, which is mounted upon a shaft 130. The shaft 130 extends across the frame 1 of the cotton picker, and it has a crank handle 132 detachably mounted upon one end of the same, for rotating the shaft 130, and the shaft 126, for raising and lowering the rack 125. The foregoing structure is duplicated upon each side of the machine, so as to raise both ends of the axle 2 evenly.

In the operation of the improved cotton picker the propelling power of the cotton picker is provided from the rear end of the same, so as to prevent the mutilation or breaking of the cotton plants, thereby, and the cotton picker is forced or driven into the plant. The rotation of the axle 2, and consequently the supporting wheels 3, will rotate the shaft 30, when the clutch segments 35 and 36, are meshing, the sprockets 34 will also be rotated, which will operate the chains 42, and rotate the shafts 46 and 47, for propelling the sprocket chains which are operatively connected thereto. The movement of the sprocket chains causes the gangs of spindles carried by both the front picking structure and the rear picking structure 110, to move about their triangularly shaped supporting frames. When the gangs of picking spindles are traveling along the forward edges of the triangular frames, they are positioned vertically, and owing to the fact that the rack bars extend along both the forward and rear angled sides of the rectangular frame, the spindles 55 and 111 will be rotated as well as moved along the frames. The rotation of the spindles, each spindle rotating in a direction opposite to the rotation of the spindle next thereto, will cause the barbs 63, formed upon the spindles, to engage the raw cotton or cotton fiber, and pull the same from the pods. The cotton will cling to the spindles during their travel upwardly along the rear sides of the substantially triangularly shaped frames, and when, or immediately after each gang of spindles reaches the top of the rack bars, they will be moved from a vertical position to an inclined position by the engagement of the arms 76 with the projection 79. When the gangs of spindles are turned to an inclined or angled position, they will be maintained in such position by the portions 74 riding upon the upper surface of the frame 72.

When the spindles are positioned on the horizontal side of the triangular frames, the stripping fingers 82 and 112, pass between the fingers, which have previously been turned, by means of the projections or lugs 83, so that the smooth sides of the spindles will be facing each other, and strip the cotton from the spindles. After the cotton has been stripped from the spindles, they reach the projection 140, which is secured to the upper horizontal portion 80 of the frame 92, which projection engages the arms 75, and turns the frames 56 and consequently the triangular portion 74, over, positioning the spindles so that they extend outwardly and forwardly of the frame 1 of the cotton picking machine, so that, during their further travel, they will be properly positioned for entering the cotton in a vertical plane.

The cotton, after being stripped from the spindles, is deposited into the trough 94, from which it is carried by the conveyer 95, into the housing 98. The spiral feed screw 99, feeds the cotton through the housing 98 and packs it into a sack, or other analogous receptacle, which may be attached to the outer end of the housing 98, by means of the clips 101 and 102, after which the cotton is ready for transportation to a gin, or store house.

When it is desired to transport the improved cotton picker from one field to another, or within a field in an inoperative position, the clutch segments 35 and 36 are moved out of engagement with each other, which allows the shaft 30 to run free with respect to the sprocket 34, and consequently eliminate the movement of the sprocket chain 42, and its co-acting parts. The frame is also raised, by means of the rack 125, so that the spindles will be raised above a cotton engaging position.

When the machine is in operation, the chain 32 is geared so that the main supporting wheels 3 will move forward on the ground, a distance equal to the distance covered by the rearward movement of a spindle gang on the downwardly sloping sides of the triangular frames, thereby bringing the spindle gang into and out of the cotton without being dragged forward, substantially decreasing the liability of the breaking and mutilation of the cotton plant and increasing the cleanliness of the raw cotton gathered by the picker.

In Figs. 13 and 14, a modified form of the structure for regulating the operation of the spindles, is provided. In these views, the picking spindles 150 are rotatively supported by frames 151, and each spindle is operatively connected to the spindle next thereto, by means of gears 152, which mesh with each other, rotating each spindle in a direction oppositely to the direction of the rotation of the spindle next thereto. The outermost of the spindles 150, of each gang, has beveled gears 153 mounted upon their ends interiorly of the frames 151, which beveled gears mesh with beveled gears 154. The beveled gears 154 have ordinary gear teeth indicated at 155 formed upon a section of their peripheries, which mesh with the teeth of rack bars 156. The rack bars 156 are carried by an auxiliary frame 157, which is secured to the main frame of the cotton picking machine. In the form illustrated in these figures, the triangularly shaped members 74 and their co-acting arms 75 and 76, are eliminated, and the frames 151 have arms 160 connected to their outer ends and extending outwardly therefrom substantially parallel to the picking spindles 150. The arms 160 have their outer ends angled, as is shown at 161. Rollers 162 are mounted upon the angled ends 161 of the arms 160, and the rollers ride in channels 163, which are carried by the sides of the triangularly shaped frames 165, of the cotton picking machine. The channels 163 extend entirely above the outer surface of the triangularly shaped frames 165, and they have upstanding humps 166 formed thereon, rearwardly of the portions of the channels which position the spindles substantially at right angles to the stripping fingers, for turning the gang-carrying frames 151 and their spindles over to position the spindles for proper entrance into a cotton plant for picking cotton. A projection 167 is provided upon the frame 165, for engagement with the gangs 151, for facilitating the turning movement of the spindles 150, after each gang of the same passes beyond the position wherein they are acted upon by the stripping fingers.

The supporting structure 1 of the cotton picker, has a forwardly extending framework construction 200, and an obliquely disposed framework 201, which are positioned forwardly of the front and rear gangs of spindles, respectively. The skeleton frames 200 and 201 are provided for bending down the cotton plants, causing all of the plants to be at a uniform height when engaged by the picking spindles.

From the foregoing description taken in connection with the accompanying drawings the advantages of construction and of the method of operation of the improved cotton picker will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a cotton picker, the combination of a supporting frame, substantially triangularly shaped tracks carried by said frame and being disposed in a forward pair and a rearward pair, a plurality of auxiliary frames for travel on said tracks, means for causing said auxiliary frames to travel over said tracks, a plurality of cotton picking spindles carried by each of said auxiliary frames, said frames being pivotally supported for permitting said spindles to assume a vertical position when in a cotton picking position, the spindles carried by the frames for travel about said rearward track being disposed staggeredly to the spindles carried by the auxiliary frames for travel on said forward pair of tracks, and means for rotating said spindles while positioned vertically.

2. In a cotton picker, the combination of a supporting frame, substantially triangularly shaped tracks carried by said frame and being disposed in a forward pair and a rearward pair, a plurality of auxiliary frames for travel on said tracks, means for causing said auxiliary frames to travel over said tracks, a plurality of cotton picking spindles carried by each of said auxiliary frames, said frames being pivotally supported for permitting said spindles to assume vertical position when in a cotton picking position, the spindles carried by the frames for travel about said rearward track being disposed staggeredly to the spindles carried by the auxiliary frames for travel on said forward pair of tracks, means for automatically moving said spindles from a vertical position into an angled position with respect to the vertical after movement out of a cotton picking position, means for stripping the cotton from said spindles when in an angled position, and means for rotating said spindles while positioned vertically.

3. In a cotton picker, the combination of a supporting frame, substantially triangularly shaped tracks carried by said frame and being disposed in a forward pair and a rearward pair, a plurality of auxiliary frames for travel on said tracks, means for causing said auxiliary frames to travel over said tracks, a plurality of cotton picking spindles carried by each of said auxiliary frames, said frames being pivotally supported for permitting said spindles to assume a vertical position when in a cotton picking position, the spindles carried by the frames for travel about said rearward track being disposed staggeredly to the spindles carried by the auxiliary frames for travel on said forward pair of tracks, means for automatically moving said spindles from a vertical position into an angled position with respect to the vertical after movement out of a cotton picking position, endless belts carried by said supporting frame, a plurality of spaced stripping fingers carried by said belts and positioned for travel between said picking spindles when the latter are in an angled position for stripping the cotton from said spindles.

4. In a cotton picker, the combination of a supporting frame, substantially triangularly shaped tracks carried by said frame and being disposed in a forward pair and a rearward pair, a plurality of auxiliary frames for travel on said tracks, means for causing said auxiliary frames to travel over said tracks, a plurality of cotton picking spindles carried by each of said auxiliary frames, said frames being pivotally supported for permitting said spindles to assume a vertical position when in a cotton picking position, the spindles carried by the frames for travel about said rearward track being disposed staggeredly to the spindles carried by the auxiliary frames for travel on said forward pair of tracks, means for automatically moving said spindles from a vertical position into an angled position with respect to the vertical after movement out of a cotton picking position, endless belts carried by said supporting frame, a plurality of spaced stripping fingers carried by said belts and positioned for travel between said picking spindles when the latter are in an angled position for stripping the cotton from said spindles, troughs carried by said frame for receiving the cotton from said stripping fingers, endless conveyers positioned within said troughs, and cotton sacking means carried by said supporting frame for receiving the cotton from said troughs.

5. In a cotton picker, the combination, of a supporting structure, a plurality of auxiliary frames, a plurality of cotton picking spindles carried by each of said frames, gears mounted upon said spindles, rack bars carried by said supporting structure, gears meshing with said rack bars, means for causing said gears to travel over said rack bars, and beveled gears connecting said spindle-carried gears and said last named gears for rotating said spindles by the travel of said last named gears over said rack bars, said spindle-carried gears meshing for rotating each spindle in a direction oppositely to the rotation of the spindle next thereto.

6. In a cotton picker, a supporting frame, a plurality of sprockets carried by said frame and disposed in triangular formation, sprocket chains for travel over said sprockets and in a triangular path, a plurality of cotton picking spindles pivotally supported by said sprocket chains, gears mounted upon said spindles, rack bars carried by said supporting frame, gears meshing with said rack bars, means for moving said gears over said rack bars, and beveled gears connecting said spindle carried gears and said last named gears for rotating said spindles by the travel of said last named gears over said rack bars, said spindle carried gears meshing for rotating the spindles in a direction oppositely to the rotation of the spindle next thereto.

7. In a cotton picker, a supporting frame, a plurality of sprockets carried by said frame and disposed in triangular formation, sprocket chains for travel over said sprockets and in a triangular path, a plurality of cotton picking spindles pivotally supported by said sprocket chains, gears mounted upon said spindles, rack bars carried by said supporting frame, gears meshing with said rack bars, means for moving said gears over said rack bars, beveled gears connecting said spindle carried gears and said last named gears for rotating said spindles by the travel of said last named gears over said rack bars, said spindle carried gears meshing for rotating the spindles in a direction opposite to the rotation of the spindle next thereto, said spindles positioned vertically when in a cotton picking position, means for automatically moving said spindles into an angled position with respect to the vertical when moved out of a cotton picking position, and means for stripping cotton from said spindles when moved out of a cotton picking position, and means for stripping cotton from said spindles when in an angled position.

8. In a cotton picker, the combination, of a supporting frame, substantially triangular shaped tracks carried by said frame and being disposed in a forward pair and a rearward pair, a plurality of auxiliary frames for travel about said tracks, a plurality of cotton picking spindles carried by each of said auxiliary frames, gears mounted upon said spindles, rack bars carried by said supporting frame, gears meshing with said rack bars, means for moving said gears over said rack bars, bevel gears connecting said spindle carried gears and said last named gears for rotating said spindles by the travel of the last named gears over said rack bars, said spindle carried gears meshing for rotating each spindle in a direction oppositely to the rotation of the spindle next thereto, said frames being pivotally supported for permitting said spindles to assume a vertical position when in a cotton picking position, the spindles carried by the frames for travel about said rearward track being disposed staggeredly to the spindles carried by the auxiliary frames for travel about said forward pair of tracks.

9. In a cotton picker, the combination of a supporting frame, substantially triangular shaped tracks carried by said frame and being disposed in a forward pair and a rearward pair, a plurality of auxiliary frames for travel about said tracks, a plurality of cotton picking spindles carried by each of said auxiliary frames, gears mounted upon said spindles, rack bars carried by said supporting frame, gears meshing with said rack bars, means for moving said gears over said rack bars, bevel gears connecting said spindle carried gears and said last named gears for rotating said spindles by the travel of the last named gears over said rack bars, said spindle carried gears meshing for rotating each spindle in a direction oppositely to the rotation of the spindle next thereto, said frames being pivotally supported for permitting said spindles to assume a vertical position when in a cotton picking position, the spindles carried by the frames for travel about said rearward track being disposed staggeredly to the spindles carried by the auxiliary frames for travel about said forward pair of tracks, means for automatically moving said spindles into an angled position with respect to the vertical when moved out of a cotton picking position, and means for stripping cotton from said spindles when in an angled position.

10. In a cotton picker, the combination, of a supporting frame, substantially triangular shaped tracks carried by said frames, and being disposed in a forward pair and a rearward pair, a plurality of auxiliary frames for travel about said tracks, a plurality of cotton picking spindles carried by each of said auxiliary frames, gears mounted upon said spindles, rack bars carried by said supporting frame, gears meshing with said rack bars, means for moving said gears over said rack bars, bevel gears connecting said spindle carried gears and said last named gears for rotating said spindles by the travel of said last named gears over said rack bars, said spindle carried gears meshing for rotating each spindle in a direction oppositely to the rotation of the spindle next thereto, said frames being pivotally supported for permitting said spindle to assume a vertical position when in a cotton picking position, the spindles carried by the frame for travel about said rearward track being disposed staggeredly to the spindles carried by the auxiliary frames for travel about said forward pair of tracks, means for automatically moving the spindles from a vertical position into an angled position with respect to the vertical after movement out of a cotton picking position, means for stripping the cotton from said spindles when in an angled position, and means for partially rotating said spindles during movement into an angled position.

11. In a cotton picker, the combination, of a supporting frame, substantially triangularly shaped tracks carried by said frame and disposed in a forward pair and a rearward pair, a plurality of auxiliary frames for travel about said tracks, a plurality of cotton picking spindles carried by each of said auxiliary frames, gears mounted upon said spindles, rack bars carried by said supporting frame, gears meshing with said rack bars, means for moving said gears over said rack bars, bevel gears connecting said spindle carried gears and said last named gears for rotating said spindles by the travel of said last named gears over said rack bars, said spindle carried gears meshing for rotating each spindle in the direction oppositely to the rotation of the spindle next thereto, said frame being pivotally supported for permitting said spindle to assume a vertical position when in a cotton picking position, the spindles carried by the frames for travel about the rearward tracks being disposed staggeredly to the spindles carried by the auxiliary frames for travel about said forward pair of tracks, means for automatically moving said spindles from a vertical position into an angled position with respect to the vertical after movement out of a cotton picking position, endless belts carried by said supporting frame, a plurality of spaced stripping fingers carried by said belts and positioned for travel between said spindles when the latter are in an angled position for stripping the cotton from said spindles, troughs carried by said frame for receiving the cotton from said stripping fingers, endless conveyers positioned within said troughs, and cotton sacking means carried by said supporting frame for receiving the cotton from said troughs.

12. In a cotton picker, the combination, of a supporting frame, substantially triangularly shaped tracks carried by said frame and disposed in a forward pair and a rearward pair, a plurality of auxiliary frames for travel about said tracks, a plurality of cotton picking spindles carried by each of said auxiliary frames, gears mounted upon said spindles, rack bars carried by said supporting frame, gears meshing with said rack bars, means for moving said gears over said rack bars, bevel gears connecting said spindle carried gears and said last named gears for rotating said spindles by the travel of said last named gears over said rack bars, said spindle carried gears meshing for rotating each spindle in the direction oppositely to the rotation of the spindle next thereto, said frame being pivotally supported for permitting each of said spindles to assume a vertical position when in a cotton picking position, the spindles carried by the frames for travel about the rearward tracks being disposed staggeredly to the spindles carried by the auxiliary frames for travel about said forward pair of tracks, means for automatically moving said spindles from a vertical position into an angled position with respect to the vertical after movement out of a cotton picking position, endless belts carried by said supporting frame, a plurality of spaced stripping fingers carried by said belts and positioned for travel between said spindles when the latter are in an angled position for stripping the cotton from said spindles, troughs carried by said frame for receiving the cotton from said stripping fingers, endless conveyers positioned within said troughs, cotton sacking means carried by said supporting frame for receiving the cotton from said troughs, and means for partially rotating said spindles during their movement to an angled position with respect to said supporting frame and prior to the stripping of the cotton therefrom.

In testimony whereof I affix my signature in presence of two witnesses.

JOSEPH PERCY BROWN.

Witnesses:
GEO. M. BURKHARDT,
J. L. COPELAND.